UNITED STATES PATENT OFFICE 2,680,114

7-ANILINO -9- BROMO -4,5- DIMETHYL-2-PHENYLPERIMIDINE-6-ONE AND ALKALI METAL SULFONATES THEREOF

Mario F. Sartori, Wilmington, Del., assignor to E. I. du Pont de Nemours and Company, Wilmington, Del., a corporation of Delaware No Drawing. Application February 25, 1953, Serial No. 338,903

4 Claims. (Cl. 260—256.5)

This invention relates to new chemical compounds which are derivatives of 9-bromo-4,5-dimethyl-2-phenylperimidine-6-one, and which are valuable red dyes for wool and for nylon.

A number of dyes are available that give satisfactory colors on wool and on nylon, but many of these do not have good resistance or fastness to light and to washing. Also many of these give rather dull shades. In order to obtain particular shade variations, it is the general practice to apply a mixture of dyes, but this also leads to dull colors.

It is an object of this invention to provide bright red dyes which are particularly useful on wool and on nylon. It is a further object to provide novel dyestuffs which are readily and inexpensively made and which have excellent fastness to light and to washing.

There is disclosed in United States Patent No. 2,212,928 a series of anthrapyrimidine dyes of the general structural formula:

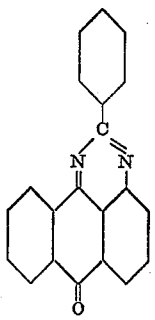

United States Patent No. 1,749,955 discloses a perimidine derivative having the formula:

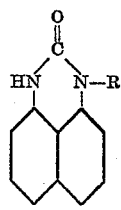

where R is a substituted or unsubstituted benzoyl radical.

Gastaldi, in Gazz. 44, 290 (1914), described the preparation of a compound of the formula:

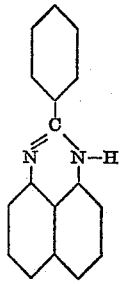

According to the present invention, I have now discovered that valuable properties are possessed by compounds of the formula:

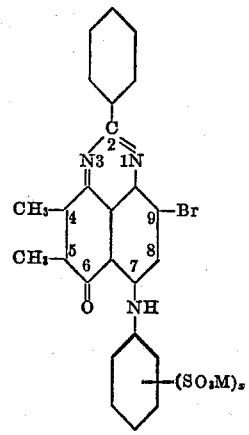

in which M is a member of the class consisting of alkali metals and hydrogen, and $x$ is an integer from 0 to 1.

These compounds may be made readily by reacting benzaldehyde and ammonia with 5-amino-6-bromo-8-anilino-2,3-dimethyl-1,4-naphthoquinone:

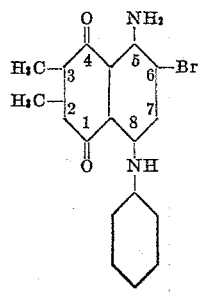

and thereafter sulfonating if the sulfonated derivative is desired. The products are crystalline substances of a red color, which are useful for dying a variety of fabrics.

The 5-amino-6-bromo-8-anilino-2,3-dimethyl-1,4-naphthoquinone starting material may be prepared according to the process described in my copending U. S. patent application Serial No. 292,737, filed June 10, 1952. In this process, the desired product is obtained from 2,3-dimethyl-1,4-naphthoquinone by nitrating to introduce a nitro group in the 5 position, reducing the nitro group with hydrosulfite, aerating in the presence of an oxidation catalyst to convert any of the leuco compound formed during the reduction back to the quinone form, brominating to introduce bromine atoms into the 6 and 8 positions, and reacting with aniline to replace the bromine atom in the 8 position with an aniline radical.

In the preferred embodiment of this invention, the compound is substituted with a sulfonic acid group, either in the form of the free acid or as an alkali metal salt, such as the sodium or potassium sulfonate. This solubilizes the compound and permits the dyeing of wool and nylon in bright red shades.

These dyes have better affinity, better penetration and better tinctorial power than the anthrapyrimidine dyes. The dyes possess very good light fastness on wool and nylon and also show very good wash fastness. Since they possess a ketonic structure they may be applied to cotton by vatting and give pink to red shades depending on the concentration.

The sulfonate derivatives are useful for dyeing wool, nylon and acrylic fibers. For wool and nylon, a dye bath is made up by dissolving the dye in water, the fabric is added, the bath is heated to the boil, acetic acid is added, and the bath is boiled until the desired shade is obtained.

For acrylic fibers, a dye bath is made by dissolving copper sulfate in the water and then adding hydroxylamine to reduce the cupric ions to cuprous ions, and finally adding the dye. The fabric is then added and the bath is heated to the boil. Boiling is continued until the desired shade is obtained.

The unsulfonated compound may be used for dyeing polyester, such as polyethylene terephthalate, or cellulose acetate fibers either with or without the use of dyeing assistants such as benzoic acid. The dye may be introduced into the dye bath as a colloidal dispersion or as a concentrated solution in a solvent, such as for example dimethyl formamide. The dye bath may contain soap or other dispersing agent, and benzoic acid or other polyester fiber dyeing assistant. The bath is brought to a boil. After agitation of the bath to ensure thorough mixing, the fiber is added and the bath is kept at about 100° C. for 1 hour. The dye exhausts onto the fiber almost completely. The fabric is then removed and rinsed.

These dyes are prepared from readily available intermediates and do not require complicated apparatus for their synthesis. Their preparation is illustrated in the following examples, in which parts are by weight.

Example 1

To 25 parts of nitrobenzene there are added 3.5 parts of 5-amino-6-bromo-8-anilino-2,3-dimethyl-1,4-naphthoquinone and 5 parts of benzaldehyde. The mass is then stirred at 120° C. while a slow stream of ammonia is bubbled through the reaction mass. The color changes progressively from blue to red. The reaction is considered to be complete when no more blue crystals can be observed upon examination of a drop of the reaction mass under a microscope. This requires about 16 hours. The reaction mass is then cooled, slurried with 20 parts of ethyl alcohol at room temperature for about 30 minutes, filtered washed with water and then ethyl alcohol, and dried. The resulting red granular solid is then crystallized from benzene and 2 parts of red crystals melting at 256–258° C. are obtained. Analysis of the 7-anilino-9-bromo-4,5-dimethyl-2-phenylperimidine-6-one shows the following:

|   | Calculated for $C_{25}H_{18}ON_3Br$ | Found |
|---|---|---|
|   | Percent | Percent |
| C | 66.5 | 66.5 |
| H | 4.0 | 4.0 |
| N | 8.0 | 8.8 |
| Br | 17.8 | 16.9 |

A chromatograph on alumina from a benzene solution shows the presence of only a single colored component.

Example 2

To 19 parts of 100% sulfuric acid at room temperature is added 0.37 part of 7-anilino-9-bromo-4,5-dimethyl-2-phenylperimidine-6-one and the mixture is stirred for 3 hours. The sulfonation mass is then poured into 50 parts of ice-water. The resulting precipitate is filtered off. The filter cake is dissolved in 800 parts of boiling water and filtered to clarify the solution. To the hot filtrate (at about 80–85° C.) there is then added 40 parts of sodium sulfate to precipitate the sodium salt of the sulfonic acid. After cooling to room temperature, the precipitate is filtered off, washed with 5% sodium sulfate solution and dried. There results about 0.5 part of a red powder containing the sodium sulfonate derivative. A paper chromatograph shows that only one colored component is present in the powder. It dyes wool a bright red shade.

This application is a continuation-in-part of my copending United States patent application Serial No. 291,565, filed June 3, 1952, now abandoned.

I claim:
1. The new chemical compound of the formula:

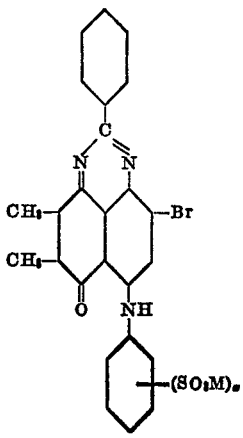

in which M is a member of the class consisting of alkali metals and hydrogen, and $x$ is an integer from 0 to 1.

2. As a new chemical compound, 7-anilino-9-bromo-4,5-dimethyl-2-phenylperimidine-6-one.

3. As a new chemical compound, the sodium sulfonate derivative of 7-anilino-9-bromo-4,5-dimethyl-2-phenylperimidine-6-one.

4. The process of making 7-anilino-9-bromo-4,5-dimethyl - 2 - phenylperimidine-6-one which comprises heating together benzaldehyde, ammonia, and 5-amino-6-bromo-8-anilino-2,3-dimethyl-1,4-naphthoquinone.

No references cited.